UNITED STATES PATENT OFFICE.

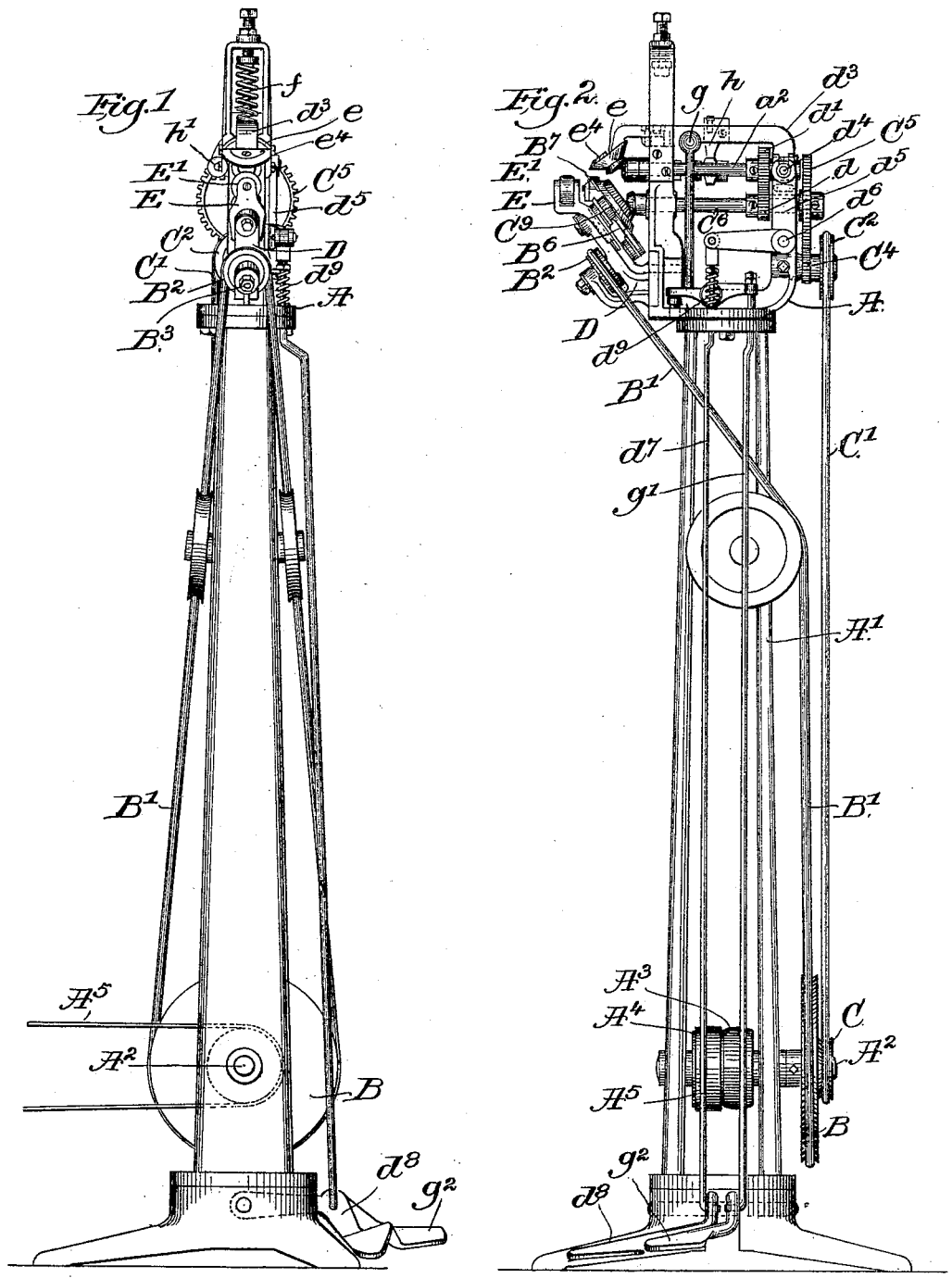

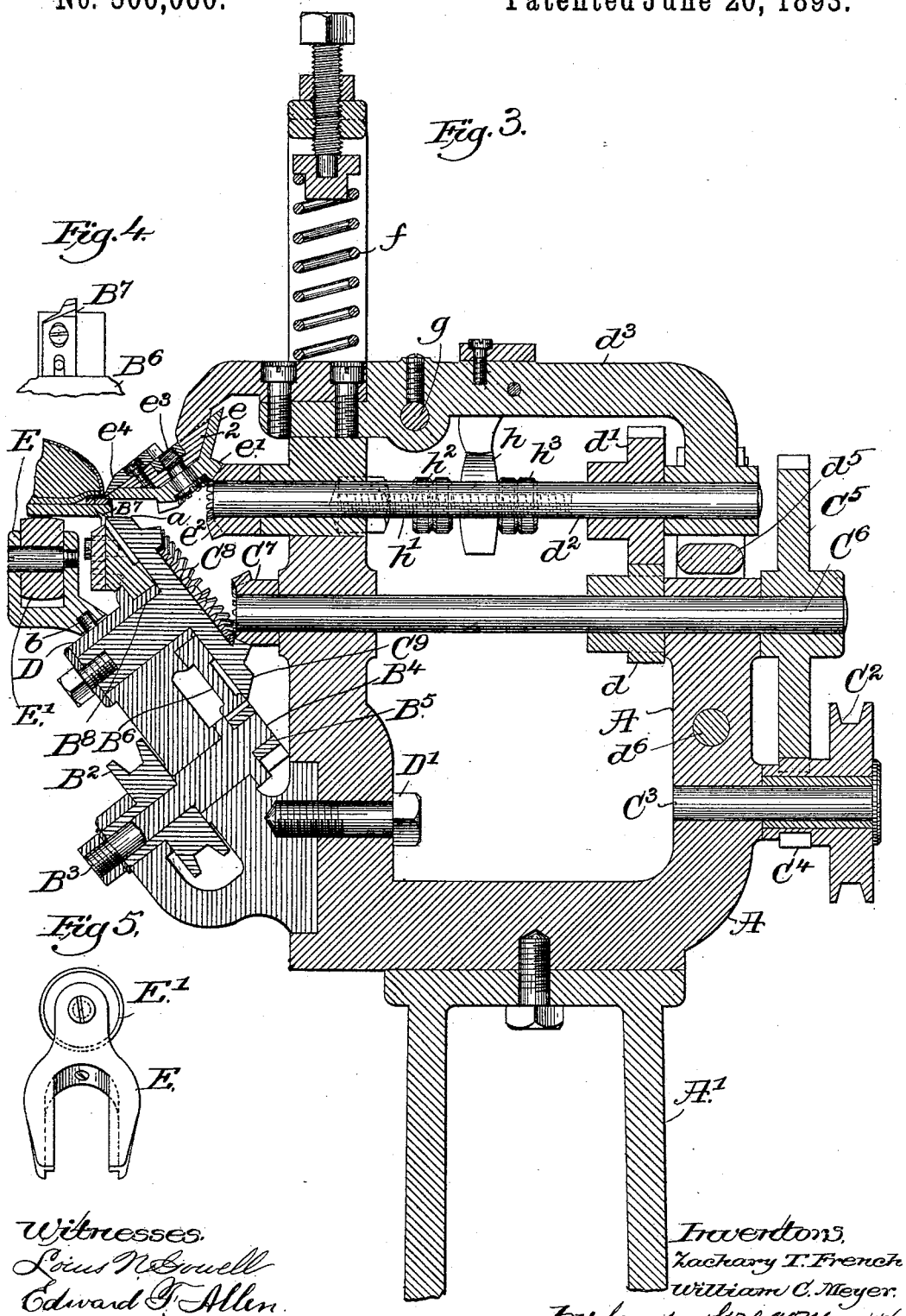

ZACHARY T. FRENCH AND WILLIAM C. MEYER, OF BOSTON, MASSACHUSETTS.

CHANNELING-MACHINE.

SPECIFICATION forming part of Letters Patent No. 500,060, dated June 20, 1893.

Application filed June 28, 1892. Serial No. 438,246. (No model.)

*To all whom it may concern:*

Be it known that we, ZACHARY T. FRENCH and WILLIAM C. MEYER, of Boston, county of Suffolk, State of Massachusetts, have invented an Improvement in Channeling-Machines, of which the following description, in connection with the accompanying drawings, is a specification, like letters and figures on the drawings representing like parts.

This invention has for its object to improve that class of machines employed more especially for channeling out-soles while on the last, and after having been fitted to the upper.

One part of our present invention relates to the knife which cuts the channel, we having combined with it suitable devices to impart to it a vibratory motion.

We have also devised a novel support for the sole, it consisting of a bevel faced wheel having gear teeth and driven positively, the said bevel face serving to support the outer edge of the sole outside the channel. Co-operating with this wheel is a bevel faced or conical presser wheel rotated positively, said bevel faced wheel grasping the welt and sole edge, and aiding in feeding the same. Co-operating with the uppermost of the said wheels is an upper-gage, or gage to bear against the upper on the last.

Our machine is adapted to cutting a channel more or less distant from the edge of the last, the edge of the last covered by the upper, in connection with the upper-gage, determining the line of the channel to be cut in the sole attached to the shoe.

Herein we have shown and will describe one well known form of knife for cutting a channel, and it will be understood that this invention is not limited to the particular form of knife shown, as instead we may use any other equivalent or well known knife or knives commonly used for cutting or grooving a channel in a sole, and by the term channel knife as herein used in the claim we intend to include any suitable channeling or grooving knife or tool.

Figure 1, in front elevation represents a channeling machine containing our improvements; Fig. 2, a right-hand side elevation thereof; Fig. 3, a much enlarged longitudinal section of the upper part of the machine shown in Figs. 1 and 2; Fig. 4, a detail showing the upper end of the knife-frame and knife; and Fig. 5, shows the center support for the sole, and the frame to which it is attached.

The frame work consists essentially as shown, of a head A, supported on a suitable column A', the head having suitable bearings and being properly shaped to receive the working parts to be described. The column, as shown, receives a power-shaft A$^2$ provided with suitable fast and loose pulleys A$^3$, A$^4$, co-operating with which is a driving belt A$^5$, said belt in practice being driven and controlled in usual ways. The power-shaft has two pulleys B, C, the one B driving a belt B' which, extended over suitable idler pulleys, is passed about a pulley B$^2$ on a short shaft B$^3$ shown best in Fig. 3, and provided with a suitable crank pin B$^4$, extended preferably in a loose block or roll B$^5$ entering a slot in the lower end of the knife lever B$^6$ provided at its upper end with the channel knife or blade B$^7$, the said lever having its fulcrum on a hollow sleeve B$^8$ attached to or forming part of the stand D firmly secured to the head by a suitable set screw D', the rotation of the shaft giving a rapid vibratory motion to the knife greatly facilitating its action and enabling it in its cutting action to reduce the resistance which it would otherwise offer to the feeding movement of the outer sole and lasted upper. The belt C' extended over the pulley C is made to rotate the pulley C$^2$ loose on a stud C$^3$ and provided with a pinion C$^4$, the latter engaging a gear C$^5$ on a shaft C$^6$ having at its outer end a bevel pinion C$^7$ which engages a crown bevel C$^8$ surrounding the center of rotation of the supporting wheel C$^9$ having a smooth bevel face $a$, against which bears the bottom of the outer sole outside the channel, said bevel faced part of said wheel also acting as one member of the feeding mechanism. The supporting wheel C$^9$ has its shank extended through a diagonally arranged bearing in the stand D, the inclination of the bearing and of the face $a$, of the wheel C$^9$ being such as to bring the face $a$, when uppermost and next the knife referred to in a substantially horizontal plane. The stand D also receives and guides a frame E on which is pivoted to rotate a center support E' for the sole to be channeled, said support, shown as a roll, serving to aid the operator to keep the face of the sole always in the same position with relation to the knife. The frame E has an adjusting device shown as a screw $b$, which may be turned as desired to enable the roller $E'$ to be set at the proper level. The shaft $C^6$ has a gear $d$ which engages a gear $d'$ fast on a shaft $d^2$ having its bearings on a yoke $d^3$ pivoted at its rear end by a pivot $d^4$ to the upper end of an elbow lever $d^5$ pivoted at $d^6$ on the head, said elbow lever having jointed to it a rod $d^7$ attached at its lower end to a treadle $d^8$, said elbow lever being acted upon by a spring $d^9$ which normally serves to keep the treadle elevated. The front end of the yoke $d^3$ is provided with a conical seat 2 which serves to guide a wheel $e$ which performs two functions, viz:—that of a presser to bear on the welt outside the upper of the shoe and also one member of the feeding mechanism. This wheel $e$ has crown bevel teeth $e'$ which are engaged by a bevel pinion $e^2$ fast on the shaft $d^2$. The wheel $e$ is kept in place on the seat 2 by a suitable stud screw $e^3$. The outer end of the yoke has attached to it the upper gage $e^4$ which acts as a guide for the upper on the last to which the sole to be channeled is attached, the said upper gage being substantially in contact with the wheel $e$. The yoke $d^3$ is acted upon near its outer end by a suitable spring $f$ made adjustable and to enable the wheel $e$ to be lifted from the welt when it is desired to put in or take out a shoe, we have jointed to the yoke at $g$, a rod $g'$ which is attached at its lower end to a treadle $g^2$. The channel to be cut in the outer or face side of the lasted outer sole, in some classes of work, has to be thrown in farther from the edge of the sole as in the shank, and to provide for this we have arranged the parts so that they stand normally in the position for shank work. The upper gage has been made adjustable horizontally with relation to the channel knife, so that when the channel is being cut about the fore part of the sole, the operator, by putting his foot on the treadle $d^8$ will throw the upper gage $e^4$ to the left viewing Figs. 2 and 3, thus causing the said gage to move the shoe in a direction to enable the knife to cut closer to the edge of the sole.

To limit the distance from the edge of the last at which the knife shall cut the channel in the sole, we have provided the yoke with the forked arm $h$ which embraces a screw $h'$ shown chiefly by dotted lines in Fig. 3, said screw being fixed in suitable bearings at one end to the head, and receiving upon it at each side of said arm $h$ suitable adjusting nuts or levers $h^2$, $h^3$. The adjustment of these nuts on the said screw toward or from each other, leaves more or less space in which the said arm may move, and consequently the said nuts determine the extreme position of the gage $e^4$ with relation to the knife. A roll $e$ carried by the yoke $d^3$, pivoted on the pivoted elbow $d^5$, may, it may be readily understood, be made to move longitudinally through the action of a suitable treadle toward and from the edge of the channel knife, so that when the distance of the channeling from the edge of the sole is to be varied, and also that the yoke carrying the roll may rise and fall, and as herein shown, the said gage mounted upon and carried by the yoke is made to partake of the movements of the yoke.

Having described our invention, what we claim, and desire to secure by Letters Patent, is—

1. In a channeling machine the following instrumentalities, viz:—a channel knife; a beveled face work supporting wheel, adapted to sustain the outer sole to be channeled; the said wheel being provided with gear teeth; a movable lever; a yoke pivoted thereon; a rotating bevel faced presser wheel, provided with gear teeth and mounted on said yoke, and adapted to bear on the welt; a shaft carried by said yoke and having a gear to engage the teeth of said presser wheel; a shaft having a gear to engage the teeth of the said work supporting wheel, and suitable gearing to rotate the said shafts and actuate said wheels at substantially the same surface speed to thus feed the sole and shoe through the machine, substantially as described.

2. In a channeling machine, the following instrumentalities, viz;—a channel cutting knife, means to reciprocate the same; a bevel faced wheel adapted to support the outer sole to be channeled, and provided with teeth; a presser wheel having a beveled face to bear on the welt, and provided with teeth; gears engaging the teeth of said bevel wheels, and suitable gearing to rotate the said wheels in unison at substantially the same surface speed to feed the sole and shoe through the machine, substantially as described.

3. In a channeling machine, a feeding and supporting wheel adapted to act upon and sustain the edge of the sole outside the line of the channel; combined with an opposed presser wheel or roll to bear on the welt portion of the shoe at the opposite side of the sole; a bearing yoke or carrier for the said presser wheel or roll; and an upper gage located near the said presser wheel or roll and carried by the said yoke and adapted to bear against the upper on the last and rise and fall with the presser roll, substantially as described.

4. In a channeling machine, the following instrumentalities, viz:—a channel knife; a wheel-like support for the side of the sole to be channeled; and a beveled face presser wheel to bear on the welt portion of the shoe at the opposite side of the sole; combined with devices to move the presser wheel substantially at right angles to the channel knife during the cutting of the channel, to thereby vary the distance of the channel from the median line of the sole, substantially as described.

5. In a channeling machine, the following instrumentalities, viz:—a channel knife; a wheel-like support for the outer face of the sole outside the channel, a bevel faced presser roll to bear against the welt portion of the sole, an upper-gage to bear against the upper next the edge of the last, and devices to move the presser roll and upper gage in unison toward and from the vertical plane occupied by the edge of the channel knife, substantially as described.

6. In a channeling machine, the following instrumentalities, viz:—a channel knife; a wheel-like support for the outer face of the sole outside the channel, a bevel faced presser roll to bear against the welt portion of the sole, an upper gage to bear against the upper next the edge of the last, devices to move the presser roll and upper gage in unison toward or from the vertical plane occupied by the edge of the channel knife, and devices to determine the extent of the lateral movement of the said presser roll and upper-gage, substantially as described.

7. In a channeling machine, the following instrumentalities, viz:—a channel knife; a beveled face feed wheel adapted to engage near its edge the outer sole to be channeled, and provided with teeth; a presser wheel mounted just above it and having a beveled face to bear on the welt, said presser wheel being provided with gear teeth; gears engaging the teeth of said feed wheel and presser wheel; suitable gears engaging the teeth of said wheels; parallel shafts carrying said gears; gearing to rotate the said shafts in unison at substantially the same surface speed to feed the sole and shoe through the machine; and an independent support for the central part of the sole, substantially as described.

8. The stand provided with a diagonal bearing, the bevel wheel $C^9$ having its shank extended through said bearing, combined with the frame E having the roller support $E'$, and an adjusting device for said frame, substantially as described.

In testimony whereof we have signed our names to this specification in the presence of two subscribing witnesses.

ZACHARY T. FRENCH.
WILLIAM C. MEYER.

Witnesses:
GEO. W. GREGORY,
EMMA J. BENNETT.